(12) United States Patent
Gourevitch et al.

(10) Patent No.: US 9,292,138 B2
(45) Date of Patent: Mar. 22, 2016

(54) SINGLE LAYER SENSOR PATTERN

(71) Applicant: Parade Technologies, Ltd., Santa Clara, CA (US)

(72) Inventors: Alexandre Gourevitch, San Jose, CA (US); Vladimir Korobov, San Mateo, CA (US); Peter Vavaroutsos, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 13/904,481

(22) Filed: May 29, 2013

(65) Prior Publication Data

US 2016/0004343 A1    Jan. 7, 2016

Related U.S. Application Data

(60) Provisional application No. 61/762,550, filed on Feb. 8, 2013.

(51) Int. Cl.
*G06F 3/044*    (2006.01)

(52) U.S. Cl.
CPC ..................................... *G06F 3/044* (2013.01)

(58) Field of Classification Search
CPC .................. G06F 3/044; G06F 3/0416; G06F 2203/04112; G06F 2203/04103; G06F 2203/04111
USPC .................................................. 345/173–178
See application file for complete search history.

(56) References Cited

U.S. PATENT DOCUMENTS

| 4,123,631 | A | * | 10/1978 | Lewis | ........................... 200/600 |
| 4,233,522 | A |   | 11/1980 | Grummer et al. | |
| 4,293,987 | A | * | 10/1981 | Gottbreht et al. | ............ 29/25.42 |
| 4,379,287 | A | * | 4/1983 | Tyler et al. | ...................... 341/33 |

(Continued)

FOREIGN PATENT DOCUMENTS

| CN | 101470557 A | 7/2009 |
| CN | 101578574 B | 7/2012 |

(Continued)

OTHER PUBLICATIONS

Ho, Tsz-Kin, et al. "32.3: Simple Single-Layer Multi-Touch Projected Capacitive Touch Panel." SID Symposium Digest of Technical Papers. vol. 40. No. 1. Blackwell Publishing Ltd, 2009.

(Continued)

*Primary Examiner* — Nicholas Lee
*Assistant Examiner* — Duane N Taylor, Jr.
(74) *Attorney, Agent, or Firm* — Morgan, Lewis & Bockius LLP

(57) ABSTRACT

An embodiment of a capacitive sensor array may comprise a first set of sensor electrodes each comprising one or more large subelements and a second set of sensor electrodes each comprising one or more small subelements. In one embodiment, each of the small subelements may be smaller than any of the large subelements, and the first set of sensor electrodes and the second set of sensor electrodes are formed from a single layer of conductive material. In one embodiment, the surface area of the capacitive sensor array may be divisible into a grid of N×M unit cells, wherein each of the N×M unit cells contains one of the large subelements and k of the small subelements, where k is greater than or equal to 2.

20 Claims, 15 Drawing Sheets

(56) References Cited

U.S. PATENT DOCUMENTS

| | | | |
|---|---|---|---|
| 4,707,845 A | 11/1987 | Krein et al. | |
| 6,452,514 B1 * | 9/2002 | Philipp | 341/33 |
| 6,590,629 B1 | 7/2003 | Hirobe et al. | |
| 7,129,935 B2 | 10/2006 | Mackey | |
| 7,202,855 B2 | 4/2007 | Shigetaka et al. | |
| 7,202,859 B1 | 4/2007 | Speck et al. | |
| 7,382,139 B2 | 6/2008 | Mackey | |
| 7,423,635 B2 | 9/2008 | Taylor et al. | |
| 7,439,962 B2 | 10/2008 | Reynolds et al. | |
| 7,499,039 B2 | 3/2009 | Roberts | |
| 7,639,234 B2 | 12/2009 | Orsley | |
| 7,821,425 B2 | 10/2010 | Philipp | |
| 7,973,771 B2 | 7/2011 | Geaghan | |
| 8,072,429 B2 | 12/2011 | Grivna | |
| 8,149,207 B2 | 4/2012 | Lai | |
| 8,243,027 B2 | 8/2012 | Hotelling et al. | |
| 8,274,488 B2 | 9/2012 | Bae | |
| 8,300,019 B2 | 10/2012 | Elias et al. | |
| 8,319,747 B2 | 11/2012 | Hotelling et al. | |
| 8,599,150 B2 | 12/2013 | Philipp | |
| 8,754,662 B1 | 6/2014 | Weng et al. | |
| 2004/0175257 A1 | 9/2004 | Pallas | |
| 2004/0239650 A1 | 12/2004 | Mackey | |
| 2005/0270273 A1 | 12/2005 | Marten | |
| 2005/0280639 A1 | 12/2005 | Taylor et al. | |
| 2006/0097991 A1 | 5/2006 | Hotelling et al. | |
| 2007/0008299 A1 | 1/2007 | Hristov | |
| 2007/0074913 A1 | 4/2007 | Geaghan et al. | |
| 2007/0074914 A1 | 4/2007 | Geaghan et al. | |
| 2007/0279395 A1 | 12/2007 | Philipp et al. | |
| 2008/0006453 A1 * | 1/2008 | Hotelling | 178/18.06 |
| 2008/0143683 A1 | 6/2008 | Hotelling | |
| 2008/0158181 A1 | 7/2008 | Hamblin et al. | |
| 2008/0246496 A1 | 10/2008 | Hristov et al. | |
| 2008/0264699 A1 | 10/2008 | Chang et al. | |
| 2008/0265914 A1 * | 10/2008 | Matsushima | 324/686 |
| 2009/0090694 A1 | 4/2009 | Hotelling et al. | |
| 2009/0159344 A1 | 6/2009 | Hotelling et al. | |
| 2009/0273570 A1 | 11/2009 | Degner et al. | |
| 2009/0314621 A1 * | 12/2009 | Hotelling | 200/600 |
| 2010/0059294 A1 * | 3/2010 | Elias et al. | 178/18.06 |
| 2010/0079384 A1 | 4/2010 | Grivna | |
| 2010/0090979 A1 * | 4/2010 | Bae | 345/174 |
| 2010/0108409 A1 | 5/2010 | Tanaka et al. | |
| 2010/0123670 A1 | 5/2010 | Philipp | |
| 2010/0144391 A1 | 6/2010 | Chang et al. | |
| 2010/0149108 A1 | 6/2010 | Hotelling et al. | |
| 2010/0201647 A1 | 8/2010 | Verweg | |
| 2010/0214247 A1 | 8/2010 | Tang et al. | |
| 2010/0214260 A1 | 8/2010 | Tanaka et al. | |
| 2010/0220071 A1 | 9/2010 | Nishihara et al. | |
| 2010/0258360 A1 * | 10/2010 | Yilmaz | 178/18.06 |
| 2010/0289774 A1 | 11/2010 | Pan et al. | |
| 2010/0321326 A1 * | 12/2010 | Grunthaner et al. | 345/174 |
| 2010/0321331 A1 | 12/2010 | Oda et al. | |
| 2011/0012845 A1 | 1/2011 | Rothkopf et al. | |
| 2011/0018841 A1 | 1/2011 | Hristov | |
| 2011/0048812 A1 * | 3/2011 | Yilmaz | 178/18.06 |
| 2011/0048848 A1 | 3/2011 | Yilmaz | |
| 2011/0062969 A1 * | 3/2011 | Hargreaves et al. | 324/658 |
| 2011/0062974 A1 | 3/2011 | Day | |
| 2011/0102361 A1 | 5/2011 | Philipp | |
| 2011/0148785 A1 | 6/2011 | Oda et al. | |
| 2011/0170099 A1 | 7/2011 | Ko | |
| 2011/0215814 A1 | 9/2011 | Dorrough | |
| 2011/0279169 A1 * | 11/2011 | Salaverry | 327/517 |
| 2012/0050180 A1 | 3/2012 | King et al. | |
| 2012/0081324 A1 | 4/2012 | Philipp | |
| 2012/0162090 A1 | 6/2012 | Chang et al. | |
| 2012/0162144 A1 | 6/2012 | F hraeus et al. | |
| 2012/0227259 A1 | 9/2012 | Badaye et al. | |
| 2012/0255167 A1 | 10/2012 | Badaye et al. | |
| 2012/0256642 A1 | 10/2012 | Badaye et al. | |
| 2012/0256851 A1 | 10/2012 | Wang et al. | |
| 2012/0262412 A1 | 10/2012 | Guard et al. | |
| 2012/0306792 A1 | 12/2012 | Powers | |
| 2013/0050105 A1 | 2/2013 | Lee et al. | |
| 2013/0061869 A1 * | 3/2013 | McCutcheon et al. | 134/1 |
| 2013/0081869 A1 * | 4/2013 | Kim et al. | 174/261 |
| 2013/0100041 A1 * | 4/2013 | Golovchenko et al. | 345/173 |
| 2013/0100054 A1 | 4/2013 | Philipp | |
| 2013/0127772 A1 | 5/2013 | Guard et al. | |
| 2013/0234974 A1 | 9/2013 | Guard | |
| 2014/0092036 A1 | 4/2014 | Lin et al. | |
| 2014/0210784 A1 | 7/2014 | Gourevitch et al. | |

FOREIGN PATENT DOCUMENTS

| | | |
|---|---|---|
| DE | 202012101378 U1 | 4/2012 |
| JP | 2010205177 A | 9/2010 |
| WO | 2011142589 A | 11/2011 |
| WO | 2012176639 A | 12/2012 |

OTHER PUBLICATIONS

"Chapter A: Wire Bonding" <www.vps.nu/img/image/Docs/safe%20light.pdf> Jun. 4, 1999 (Accessed Jun. 11, 2013).

U.S. Appl. No. 13/248,776: "Single Layer Touch Sensor," Massoud Badaye, filed Sep. 29, 2011; 36 pages.

International Search Report for International Application No. PCT/US11/53916 dated Apr. 10, 2012; 3 pages.

International Search Report for International Application No. PCT/US12/26634 dated May 29, 2012; 2 pages.

USPTO Final Rejection for U.S. Appl. No. 13/918,252 dated Dec. 10, 2013; 16 pages.

USPTO Non-Final Rejection for U.S. Appl. No. 13/528,644 dated Nov. 20, 2012; 6 pages.

USPTO Non-Final Rejection for U.S. Appl. No. 13/918,252 dated Sep. 20, 2013; 12 pages.

USPTO Notice of Allowance for U.S. Appl. No. 13/528,644 dated Jan. 25, 2013; 5 pages.

USPTO Notice of Allowance for U.S. Appl. No. 13/528,644 dated Apr. 23, 2013; 6 pages.

USPTO Notice of Allowance for U.S. Appl. No. 13/528,664 dated Jun. 7, 2013; 3 pages.

USPTO Notice of Allowance for U.S. Appl. No. 13/918,252 dated Feb. 6, 2014; 8 pages.

USPTO Requirement to Restriction for U.S. Appl. No. 13/405,071 dated Sep. 13, 2013; 5 pages.

USPTO Requirement to Restriction for U.S. Appl. No. 13/528,644 dated Aug. 21, 2012; 6 pages.

Written Opinion of the International Searching Authority for International Application No. PCT/US11/53916 dated Apr. 10, 2012; 5 pages.

Written Opinion of the International Searching Authority for International Application No. PCT/US12/26634 mailed May 29, 2012; 5 pages.

Written Opinion and Search Report of the International Searching Authority for International Application No. PCT/US1411644 mailed Jun. 23, 2014; 11 pages.

International Search Report for International Application No. PCT/US14/11644 dated Jun. 23, 2014; 2 pages.

International Search Report for International Application No. PCT/US14/16781 dated May 16, 2014; 2 pages.

International Search Report for International Application No. PCT/US14/51363 dated Dec. 18, 2014; 2 pages.

SIPO Office Action for Chinese Application No. 201280001803.8 dated Jan. 6, 2015; 6 pages.

USPTO Advisory Action for U.S. Appl. No. 13/405,071 dated Jan. 9, 2015; 3 pages.

USPTO Advisory Action for U.S. Appl. No. 14/229,524 dated Dec. 31, 2014; 3 pages.

USPTO Advisory Action for U.S. Appl. No. 14/318,354 dated Mar. 13, 2015; 3 pages.

USPTO Final Rejection for U.S. Appl. No. 13/405,071 dated Oct. 16, 2014; 18 pages.

USPTO Final Rejection for U.S. Appl. No. 14/229,524 dated Oct. 23, 2014; 16 pages.

(56) References Cited

OTHER PUBLICATIONS

USPTO Final Rejection for U.S. Appl. No. 14/318,354 dated Dec. 26, 2014; 19 pages.
USPTO Non-Final Rejection for U.S. Appl. No. 13/405,071 dated Apr. 30, 2015; 19 pages.
USPTO Non-Final Rejection for U.S. Appl. No. 13/405,071 dated Jul. 21, 2014; 15 pages.
USPTO Non-Final Rejection for U.S. Appl. No. 13/528,739 dated Apr. 29, 2015; 19 pages.
USPTO Non-Final Rejection for U.S. Appl. No. 14/229,524 dated Jul. 29, 2014; 15 pages.
USPTO Non-Final Rejection for U.S. Appl. No. 14/229,524 dated May 28, 2015; 16 pages.
USPTO Non-Final Rejection for U.S. Appl. No. 14/318,354 dated Jun. 10, 2015; 19 pages.
USPTO Non-Final Rejection for U.S. Appl. No. 14/318,354 dated Sep. 9, 2014; 18 pages.
USPTO Requirement for Restriction/Election for U.S. Appl. No. 14/229,524 dated Jun. 10, 2014; 6 pages.
Written Opinion of the International Searching Authority for International Application No. PCT/US14/11644 dated Jun. 23, 2014; 8 pages.
Written Opinion of the International Searching Authority for International Application No. PCT/US14/16781 mailed May 16, 2014; 6 pages.
Written Opinion of the International Searching Authority for International Application No. PCT/US14/51363 mailed Dec. 18, 2014; 7 pages.

* cited by examiner

SINGLE LAYER SENSOR PATTERN

RELATED APPLICATIONS

This application claims priority to U.S. Provisional Application No. 61/762,550, filed on Feb. 8, 2013, which is incorporated by reference herein in its entirety.

TECHNICAL FIELD

This disclosure relates to the field of touch-sensors and, in particular, to trace patterns of electrodes in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor electrodes that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
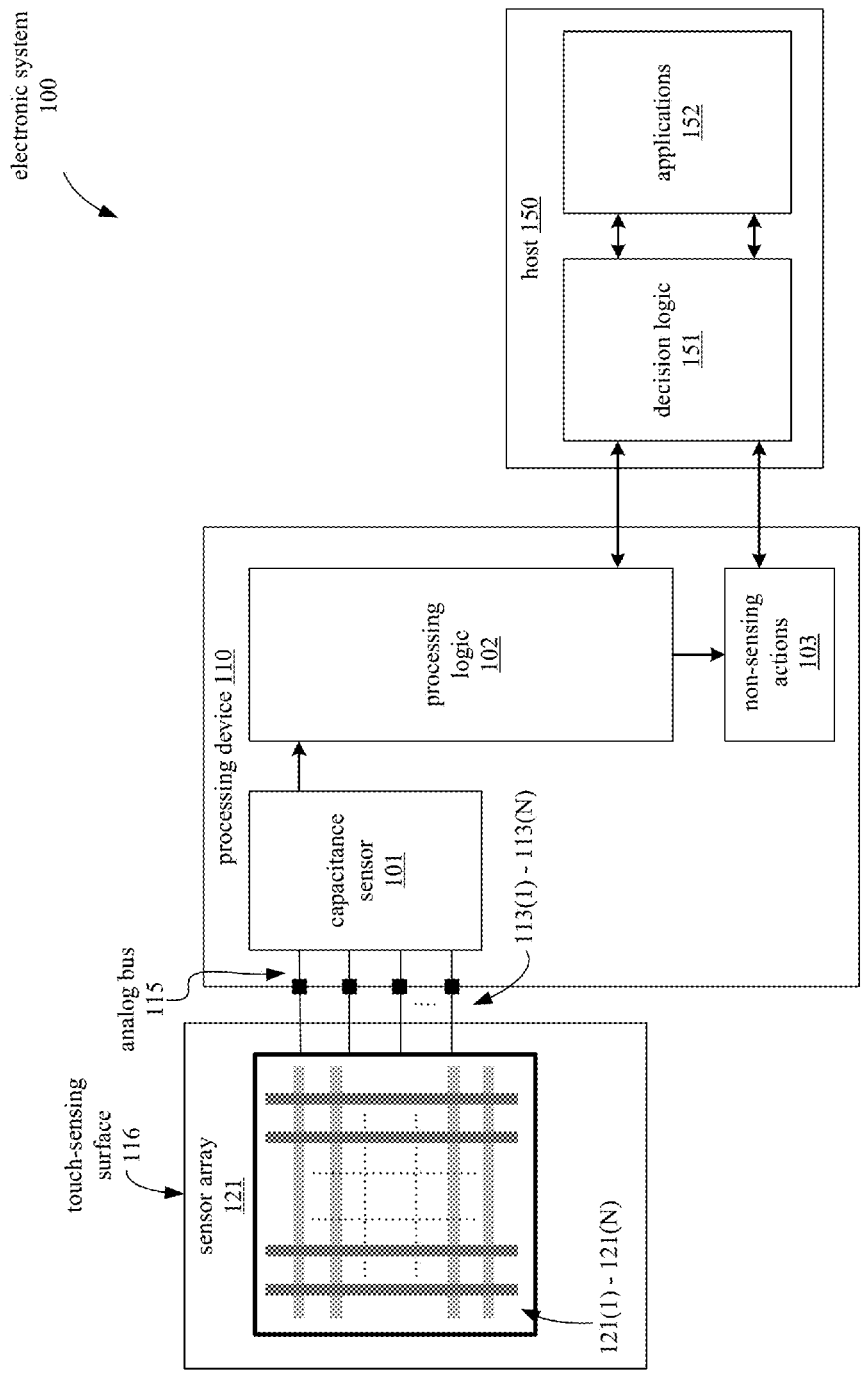
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In a capacitive touch-sensing system utilizing a capacitive touch sensor array, costs may be reduced and manufacturing yield increased by constructing the touch sensor array from a single layer of conductive material. For a single-layer sensor array pattern, the pattern may include a single layer of copper, indium-tin oxide (ITO), or other conductive material without any overlapping portions. In one embodiment, such a single layer of conductive material may include different types of conductive materials. For example, part of the single layer may be constructed from ITO while another part may be constructed from copper. In one embodiment, substantially all portions of the single layer of conductive material may lie substantially on a single plane or surface. For example, the single layer of conductive material may conform to the surface of a substrate such as glass or plastic. An embodiment of a single-layer sensor array pattern may further maximize its sensitivity to capacitance changes by minimizing the area occupied by routing channels that connect the sensor electrodes to the edge of the capacitive sensor array.

In one embodiment, a single-layer sensor pattern may have a reduced number of electrodes in order to reduce the space occupied by the routing channel; in such an embodiment, the resolution of the sensor pattern may be maintained by subdividing some of the electrodes. In one embodiment, this results in a capacitive sensor array that includes a first set of sensor electrodes each made up of one or more large subelements and a second set of sensor electrodes each made up of one or more smaller subelements. In one embodiment, each of the large sensor electrode subelements may be capacitively coupled with two or more of the smaller subelements. Thus, the resolution of the sensor array is increased because a mutual capacitance can be separately measured between the large subelement and either of the two smaller subelements.

In one embodiment, a capacitance sensor coupled with a capacitive sensor array as described above may be used to scan the capacitive sensor array by measuring the self capacitances associated with each sensor electrode, or the mutual capacitances between pairs of sensor electrodes. The capacitance sensor may then transmit the measured capacitance values to a host, where the capacitance values may be further processed to determine, for example, locations of fingers or other conductive objects near or touching the surface of the capacitive sensor array. In one embodiment, the host compensates for the capacitance differences between the regions having different patterns of conductive traces.

FIG. 1 illustrates a block diagram of one embodiment of an electronic system 100 including a processing device 110 that may be configured to measure capacitances from a touch sensing surface 116 including a capacitive sensor array as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor electrode 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor electrode detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
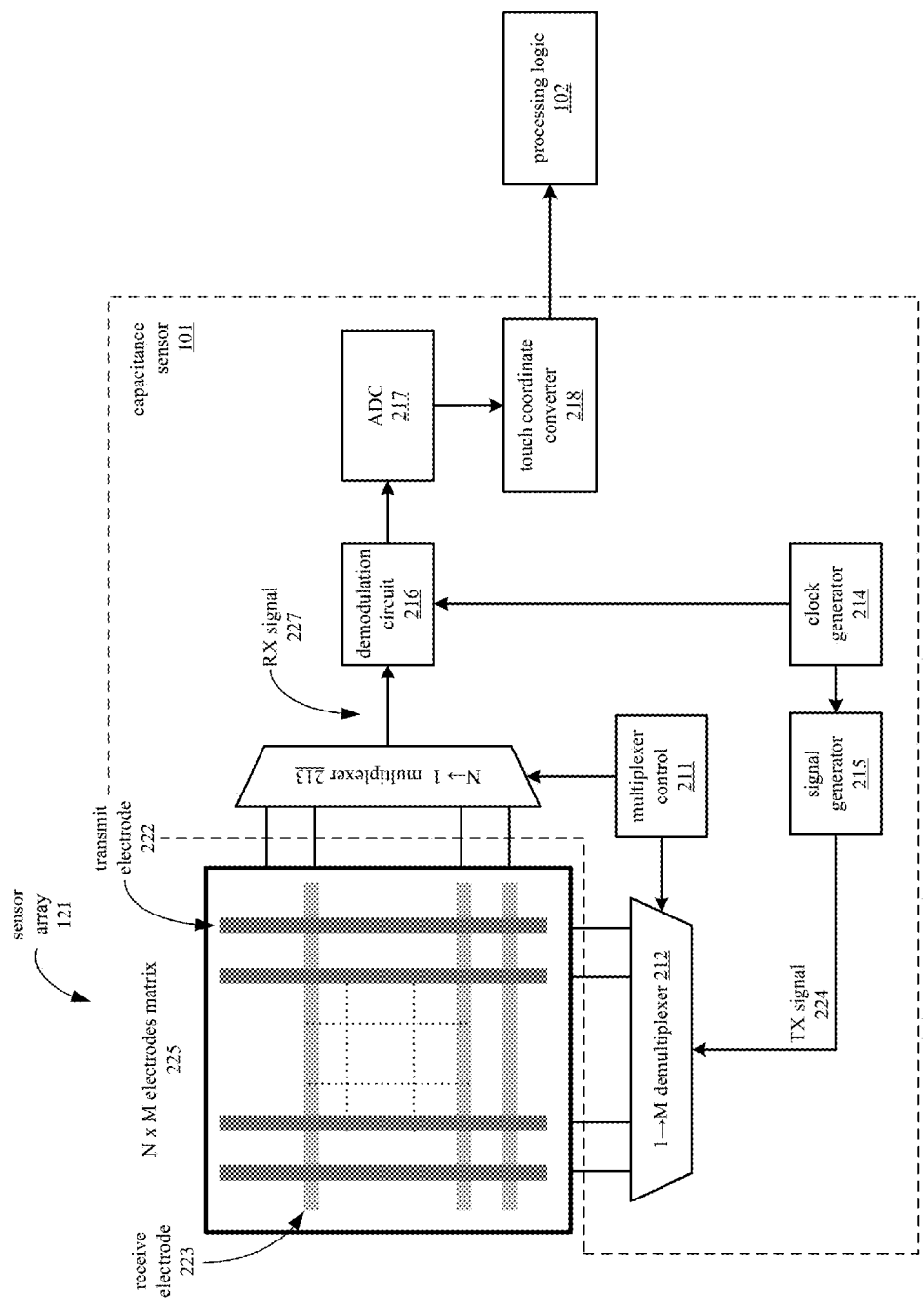
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213.

To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a change in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
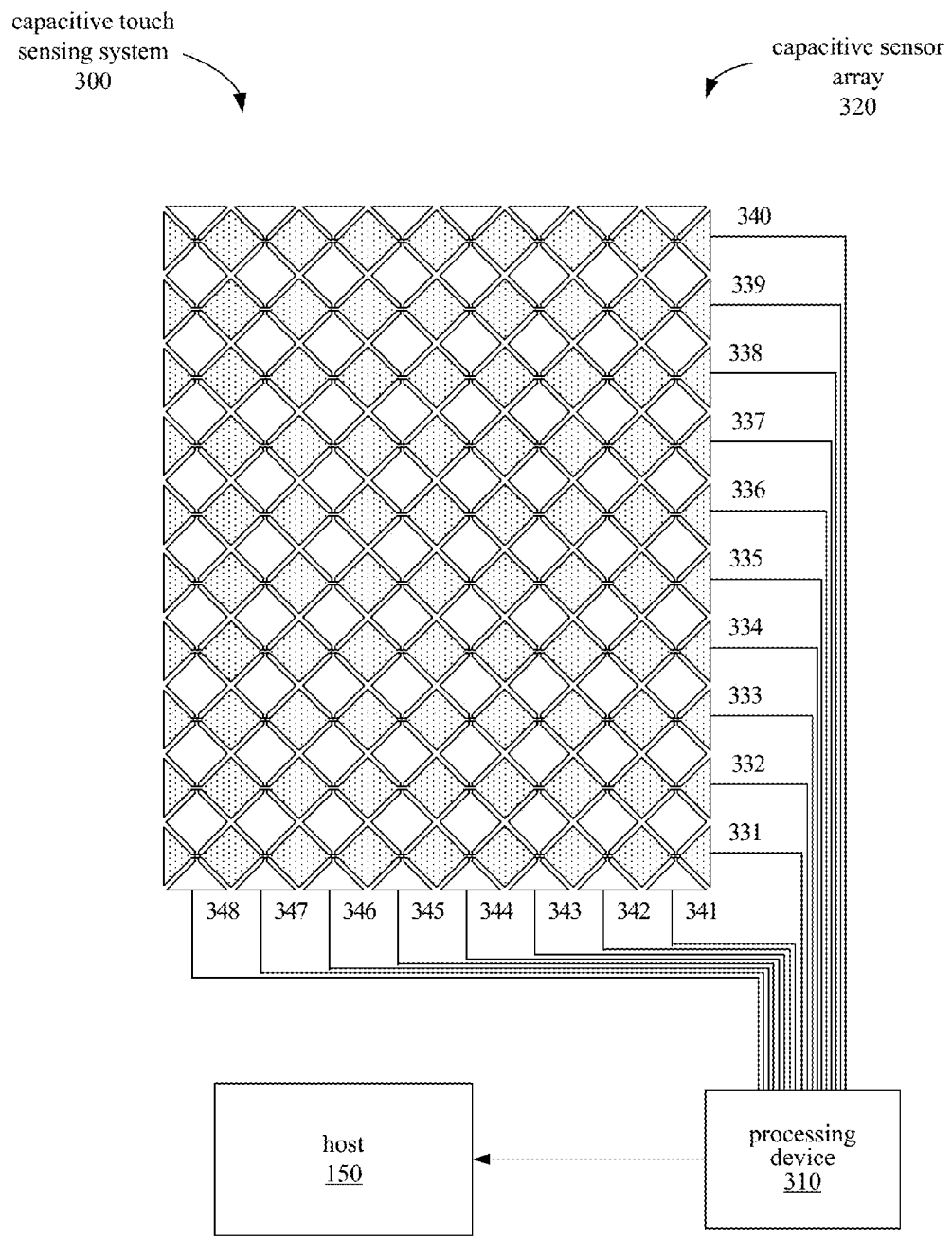
FIG. 3A illustrates an embodiment of an electronic touch-sensing system using a dual solid diamond capacitive sensor pattern.

FIG. 3A illustrates an embodiment of a capacitive touch sensing system 300 that includes a capacitive sensor array 320. Capacitive sensor array 320 includes a plurality of row sensor electrodes 331-340 and a plurality of column sensor electrodes 341-348. The row and column sensor electrodes 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor electrode and a column sensor electrode in the sensor array 320. The measured capacitances may be further processed to determine higher resolution locations of one or more contacts at the capacitive sensor array 320.

In one embodiment, the processing device 310 is connected to a host 150 which may receive the measured capacitances or calculate high precision locations from the processing device 310.

Figure 3B:
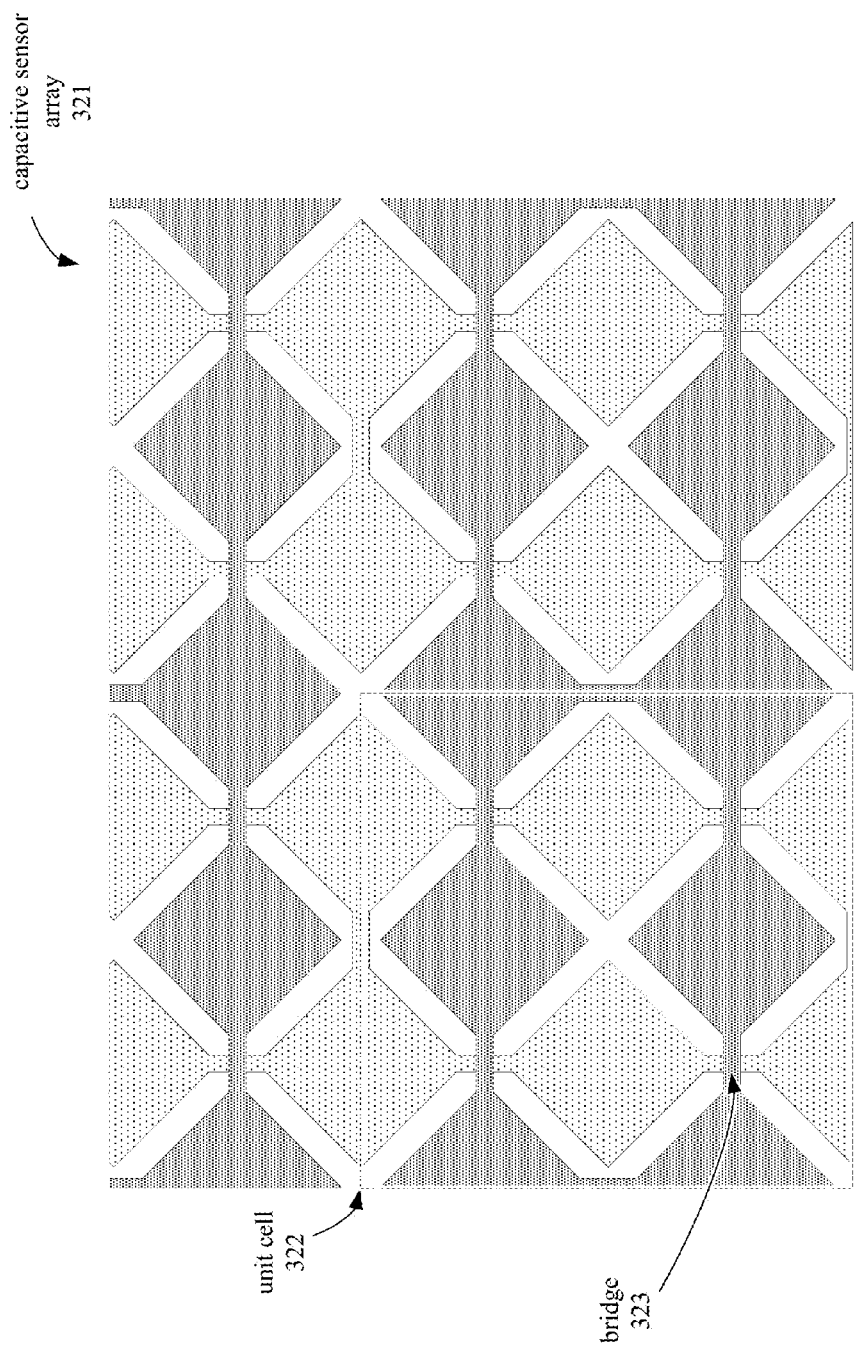
FIG. 3B illustrates an embodiment of a dual solid diamond capacitive sensor pattern.

The sensor array 320 illustrated in FIG. 3A includes sensor electrodes arranged in a diamond pattern. Specifically, the sensor electrodes 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor electrodes of capacitive sensor array 321 includes two rows or columns of electrically connected diamond shaped traces. Relative to the SSD pattern, the DSD pattern has improved signal disparity characteristics due to an increase in the coupling between TX and RX sensor electrodes while maintaining the same self-capacitance coupling possible between each sensor electrode and a conductive object near the sensor electrode. The DSD pattern may also provide higher sensitivity for tracking smaller objects, such as the point of a stylus, as compared to patterns having larger features, such as SSD. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

Figure 4A:
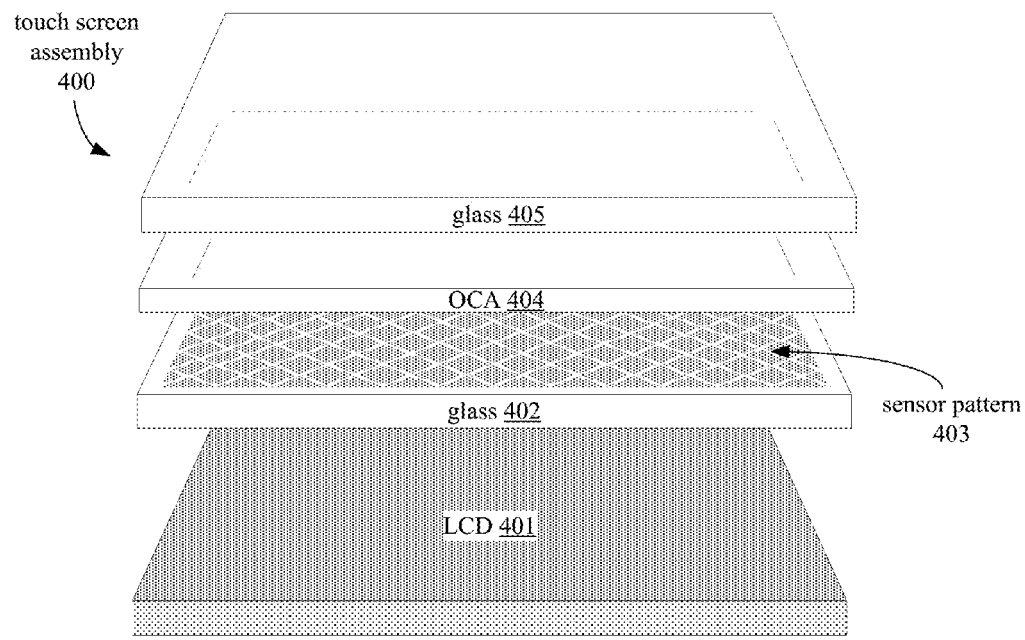
FIG. 4A illustrates components of a touch screen assembly, according to an embodiment.
Figure 4B:
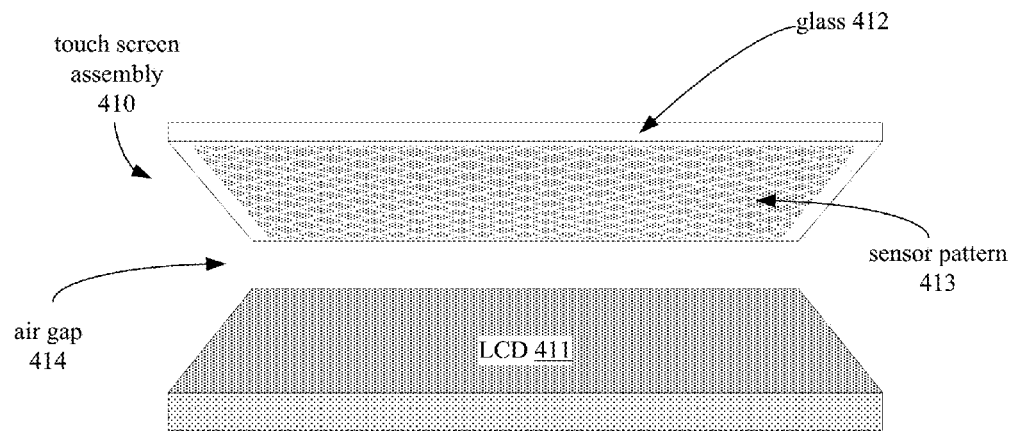
FIG. 4B illustrates components of a touch screen assembly, according to an embodiment.

FIGS. 4A and 4B illustrate embodiments of touch screen assemblies 400 and 410, respectively, that include capacitive sensor arrays. Touch screen assembly 400 includes a liquid crystal display (LCD) 401 over which glass 402 is laid. A sensor pattern 403 is constructed on the surface of glass 402. In one embodiment, the sensor pattern 403 is constructed on the surface of glass 402 that faces away from the LCD 401. Optically clear adhesive (OCA) 404 may be used to bond glass 405 to the surface of glass 402 on which the sensor pattern 403 is constructed, thus protecting the sensor pattern 403.

Touch screen assembly 410 includes an LCD 411, over which a glass 412 may be positioned. In one embodiment, sensor pattern 413 may be constructed on the surface of glass 412 that faces the LCD 411. In one embodiment, an air gap 414 may separate the glass 412 from the LCD 411.

In one embodiment, a capacitive sensor pattern such as the SSD or DSD patterns may include row and column sensor electrodes that can be expressed as a matrix of the intersections between the row and column electrodes. Resolution of the sensor array may be represented as the product of the number of columns and the number of rows. For example, for a sensor array with N row electrodes and M column electrodes, the number of intersections would be N×M.

Figure 5A:
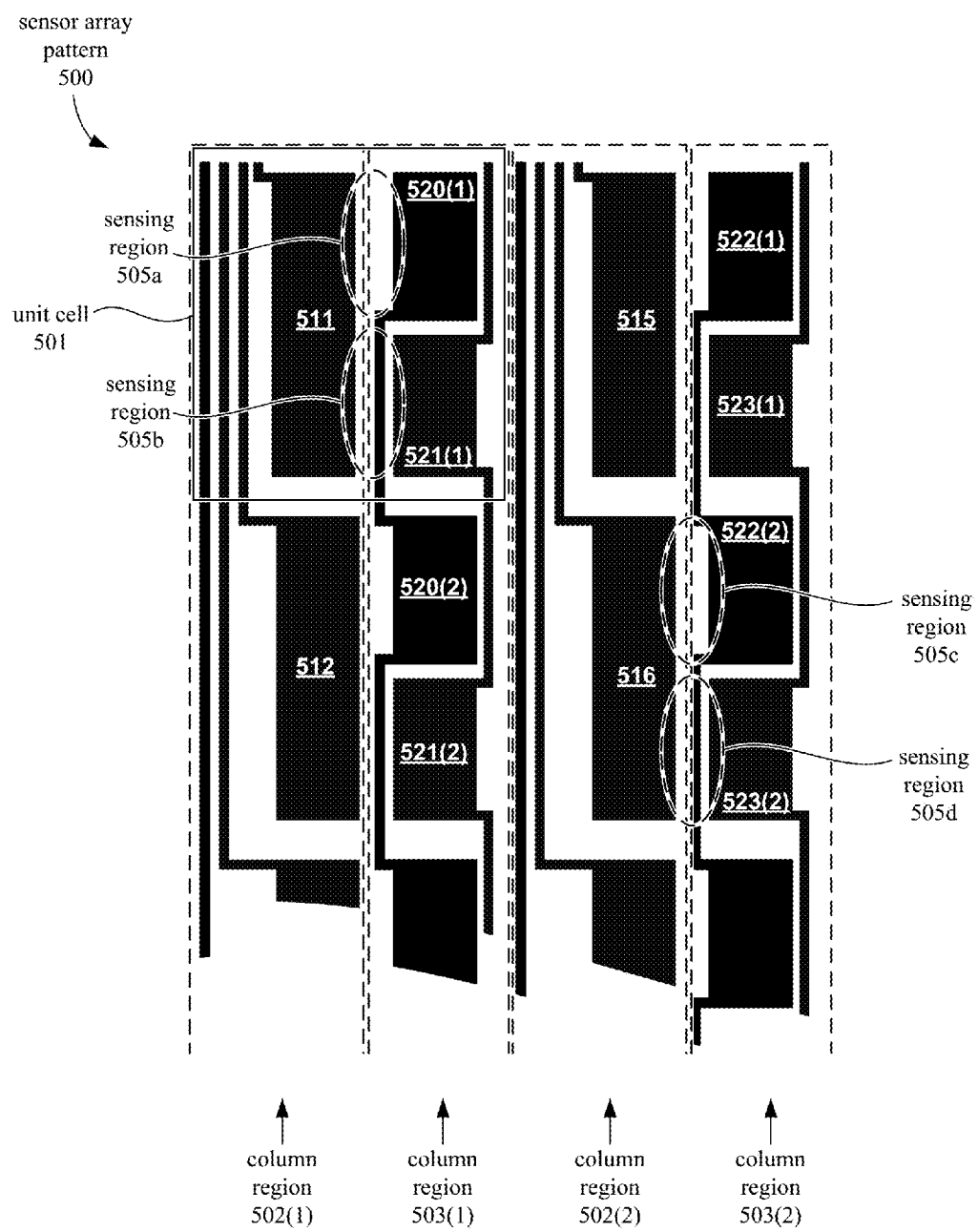
FIG. 5A illustrates a portion of a sensor array pattern, according to an embodiment.

FIG. 5A illustrates a portion of a capacitive sensor array pattern 500, according to an embodiment. As compared to the SSD or DSD patterns as described with reference to FIGS. 3A and 3B, the sensor array pattern 500 may be constructed from a single layer of conductive material without bridges or overlapping areas.

The sensor array pattern 500 includes a first set of sensor electrodes each made up of one or more large subelements, such as subelements 511, 512, 515, and 516. The sensor array pattern 500 may further include a second set of sensor electrodes each made up of one or more small subelements, such as subelements 520(1), 520(2) 521(1), and 521(2). In one embodiment, each of the small subelements is smaller than any of the large subelements in the sensor array pattern 500. In one embodiment, all of the large subelements and small subelements in the sensor array pattern 500 are constructed using a single layer of conductive material, such as copper or indium tin oxide (ITO).

In one embodiment, each of the small subelements is approximately equal in size with each of the other small subelements. In one embodiment, each of the large subelements is substantially equal in size with each of the other large subelements. In one embodiment, subelements that are substantially equal in size are designed to be nominally equal in size, but may have variations in size due to manufacturing processes.

In one embodiment, the total number of small subelements is a multiple of the total number of large subelements. The multiple may be represented as k, where k is a value that is greater than or equal to 2. Generally, for each large subelement in the sensor array pattern 500, the pattern 500 may include k small subelements. In other words, the total number of small subelements is k times the total number of large subelements in the sensor array pattern 500.

In one embodiment, the combined area of the small subelements may be less than the combined area of the large subelements. For example, the sum of the areas covered by all of the small subelements may be less than the sum of the areas covered by all of the large subelements in the sensor array pattern 500.

In one embodiment, the surface area of the sensor array pattern 500 may be considered as being divided into a grid of N×M unit cells, such as unit cell 501. The grid of unit cells thus has N rows of unit cells and M columns of unit cells. The area contained within unit cell 501 includes the large subelement 511 and two smaller subelements 520(1) and 521(1). Similarly, each of the other unit cells in the grid may include one large subelement and two small subelements, as illustrated in FIG. 5A. Generally, each unit cell may contain one large subelement and k small subelements, where k is an integer greater than or equal to 2.

Each unit cell thus includes the regions of greatest capacitive coupling between the large subelement and the k small subelements. These regions of greatest capacitive coupling are the areas at which a mutual capacitance between the large subelement and small subelement may be most influenced by the presence of a conductive object. With reference to FIG. 5A, for example, the unit cell 501 includes a first region 505a of greatest capacitive coupling between the large subelement 511 and the small subelement 520(1), and also includes a second region 505b of greatest capacitive coupling between the large subelement 511 and the small subelement 521(1).

In one embodiment, a capacitance sensor such as capacitance sensor 101, as illustrated in FIG. 1, may be configured to measure mutual capacitances between the large subelement 511 and the small subelements 520(1) and 521(1). Thus, for the unit cell 501, the capacitance sensor 101 may measure two mutual capacitance values. Generally, the capacitance sensor 101 may measure k mutual capacitance values, including one mutual capacitance value for each pairing of the large subelement with each of k small subelements in the unit cell.

In one embodiment, the capacitance sensor 101 may generate a matrix of mutual capacitance values each corresponding to a pairing between one of the large subelements and one of the small subelements. In one embodiment, a capacitance sensor that is normally configured to measure mutual capacitances from a SSD or DSD capacitive sensor array having N rows and M columns may be used to measure mutual capacitances from a single layer sensor array such as sensor array 500. For example, the first set of sensor electrodes made up of large subelements may be treated as row sensor electrodes, while the second set of sensor electrodes made up of small subelements may be treated as column sensor electrodes.

In one embodiment, the large or small subelements that are being used as row subelements may be electrically coupled together during a capacitance sensing scan. For example, large subelements 511 and 515 may be electrically coupled together by a switch or other type of connection during the sensing process. In one embodiment, this connection may be implemented in the capacitance sensor.

For example, the large subelement 516 and small subelements 522(2) and 523(2) may be connected to the capacitance sensor instead of row sensor electrode 339 and column electrodes 346 and 345 of sensor array 320 illustrated in FIG. 3A, respectively. However, the intersections between row electrode 339 and column electrodes 346 and 345 are arranged horizontally while the sensing regions 505c and 505d between the large subelement 516 and small subelements 522(2) and 523(2) are arranged vertically. For example, the region 505c of greatest capacitive coupling between subelement 516 and subelement 522(2) lies along a vertical axis along with the region 505d of greatest capacitive coupling between subelement 516 and subelement 523(2).

Thus, the resulting matrix of N×M measured mutual capacitance measurements may be transformed via a matrix transformation to generate a transformed matrix storing the capacitance values in positions that correspond to the actual locations of the sensing regions. In one embodiment, an N×M matrix of capacitance values may be transformed into a (N×k)×(M/k) matrix.

In one embodiment, the surface area of the capacitive sensor array pattern 500 may be considered as being divided into a number of column regions. In one embodiment, the area is divisible into two sets of column regions, where each column region in the first set includes the large sensor electrode subelements and each column region in the second set includes the small sensor electrode subelements. In one embodiment, each of the N×M unit cells would thus overlap one of the first set of column regions and one of the second set of column regions. For example, unit cell 501 overlaps both of column regions 502(1) and 503(1).

With reference to FIG. 5A, a first set of column regions may include column regions 502(1) and 502(2), which include the large subelements 511, 512, 515, and 516. A second set of column regions may include column regions 503(1) and 503(2), which include small subelements 520(1), 520(2), 521(1), 521(2), 522(1), 522(2), 523(1), and 523(2). In one embodiment, each of the column regions in the first set of column regions may include N large subelements, while each of the column regions in the second set of column regions may include N×k small subelements. For example, where k is equal to 2, a column region from the first set including 4 large subelements may be adjacent to a column region from the second set including 8 small subelements.

In one embodiment, the column regions of the first set are interleaved with the column regions of the second set such that the column regions from either set alternate along an axis perpendicular to the lengths of the column regions. As illustrated in FIG. 5A, the column regions 502 alternate with the column regions 503 along a horizontal axis that is perpendicular to the lengths of the column regions 502 and 503. In one embodiment, each unit cell may overlap one column region from each of the two sets of column regions. For example, unit cell 501 overlaps column region 502(1) from the first set of column regions and column region 503(1) from the second set of column regions.

In one embodiment, the column regions 502 and 503 may extend from a first edge of the surface area of the capacitive sensor array 500 to a second edge of the surface area, which may be opposite the first edge. In one embodiment where the surface area of the sensor array is substantially rectangular, each of the column regions may extend from a top edge of the surface area of the capacitive sensor array to a bottom edge of the surface area.

Figures 5B, 5C:
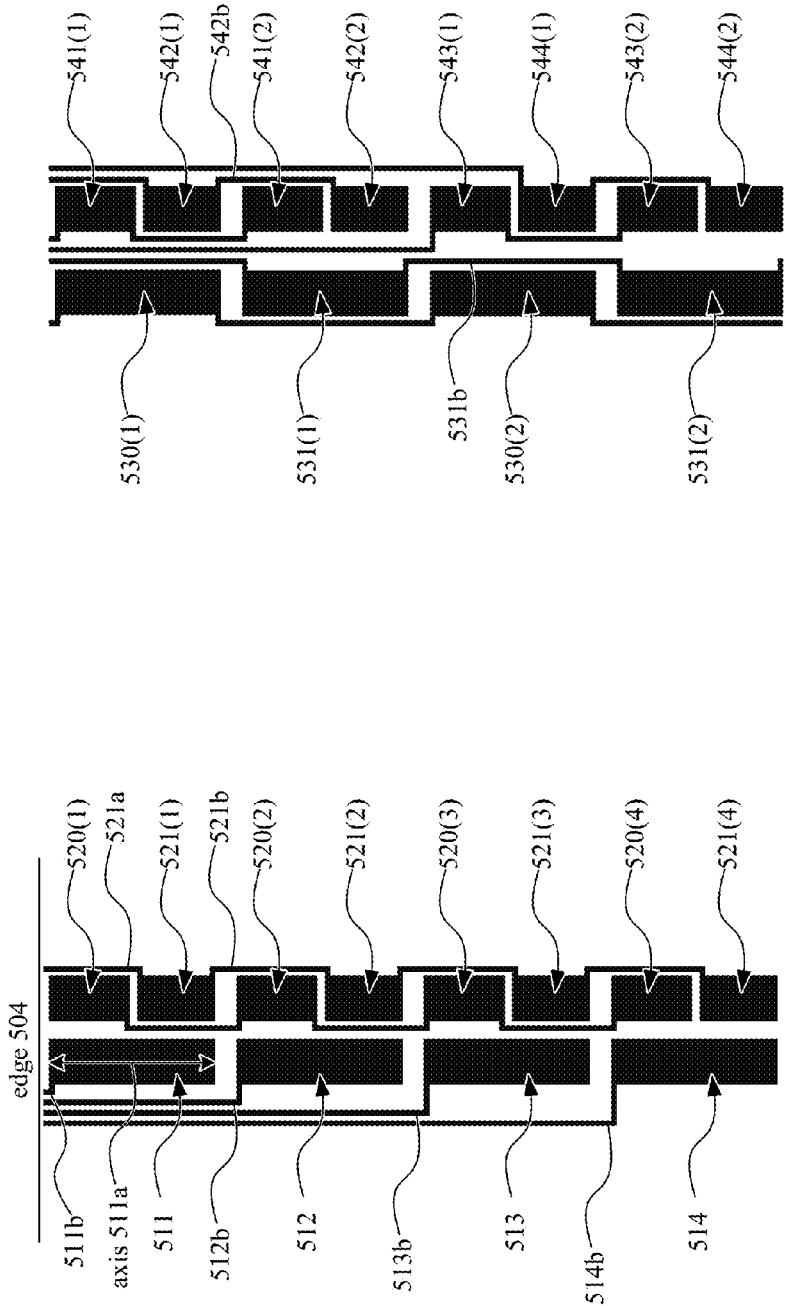
FIGS. 5B and 5C illustrate embodiments of sensor array patterns.

FIG. 5B illustrates two columns, or four unit cells, of a sensor array pattern similar to the sensor array pattern 500 illustrated in FIG. 5A. Subelements 511, 520(1), and 521(1) are contained within the same unit cell. Subelements 512, 520(2), and 521(2) are contained within the same unit cell. Subelements 513, 520(3), and 521(3) are contained within the same unit cell. Subelements 514, 520(4), and 521(4) are contained within the same unit cell. Subelements 511-514 are in the same column region from a first set of column regions and subelements 520-521 are in the same column region from a second set of column regions.

In one embodiment, the small subelements 520(1) and 521(1) within the same unit cell as large subelement 511 may be arranged along an axis parallel to a longitudinal axis 511a of the large subelement 511. In one embodiment, the large subelements 511-514 are substantially equal to each other in size. In one embodiment, the small subelements 520-521 are substantially equal to each other in size.

In one embodiment, as illustrated in FIG. 5B, each of the large subelements 511-514 is electrically isolated from each of the other subelements 511-514 that are in the same column region, or that are in a different row of the grid of N×M unit cells. In one embodiment, each of the sensor electrodes including large subelements may also include a routing trace extending from the one or more of the large subelements to an edge of the surface area. For example, each of the large subelements 511, 512, 513, and 514 may be electrically connected to routing traces 511b, 512b, 513b, and 514b, respectively, which extend towards the edge 504 of the capacitive sensor array where they can be connected to a capacitance sensor.

In one embodiment, each of the small subelements 520-521 is electrically coupled via one or more connecting traces with at least another one of the small subelements 520-521 in a same column of the grid of N×M unit cells. For example, connecting trace 521b electrically connects small subelement 521(1) with another small subelement 521(2) in the same column region, but in a different row of unit cells. In one embodiment, the small subelements within the same column region make up two sensor electrodes that have their respective subelements interleaved so that the subelements belonging to the electrodes alternate from one end of the column region to the opposite end.

In one embodiment, a small subelement that has its greatest capacitive coupling with a first large subelement may be electrically connected via a connecting trace to a different small subelement that has its greatest capacitive coupling with a second large subelement. For example, the small subelement 521(1) is closest to and has its greatest capacitive coupling with large subelement 511; subelement 521 is electrically connected via connecting trace 521b to small subelement 521(2), which is closest to and has its greatest capacitive coupling with large subelement 512.

In one embodiment, a sensor electrode may include a subelement in each row of unit cells. Specifically, the small subelements make up two sensor electrodes; the subelements 520 are electrically coupled by conductive traces to form one sensor electrode, and the subelements 521 are electrically coupled by conductive traces to form another sensor electrode. In one embodiment, each of the small subelements 520-521 is wider than any of the one or more connecting traces between the small subelements.

In one embodiment, one or more of the sensor electrodes consisting of small subelements may be connected to a routing trace that extends towards an edge of the capacitive sensor array. The routing traces may thus extend from one or more of the small subelements to an edge of the surface area so that they can be connected to a capacitance sensor. For example, routing trace 521 is electrically connected to subelements 521 and extends from the subelements 521 toward an edge 504 of the capacitive sensor array.

The sensor array pattern as illustrated in FIG. 5B has two sensing regions for each of four unit cells. Accordingly, the resolution of the column (which corresponds to the number of sensing regions) may be determined by N×k; thus, in this example the resolution is 8, since N=4 and k=2. In one embodiment, the total number of routing traces per column corresponding to this layout may be calculated using the equation R=N+k, where R is the number of routing traces. In the example as illustrated in FIG. 5B, N=4 and k=2; thus, 6 routing traces may be used to connect the electrodes within each column of unit cells to the edge of the sensor array area. In one embodiment, the ratio of sensing regions (N×k) to routing traces (N+k) is at least (N×k):(N+k) for a given column.

FIG. 5C illustrates an embodiment of a sensor array pattern where each of the large subelements is electrically coupled with at least another large subelement in the same column of the grid of N×M unit cells, and where each of the small subelements is electrically coupled with at least one other small subelement in a different unit cell.

For example, each of the large subelements 530 and 531 is electrically connected via one or more conductive connecting traces to another of the large subelements. Subelement 530(1) is connected via a connecting trace 530b to subelement 530(2), which is in the same column as subelement 530(1), but in a different unit cell in a different row of unit cells. Similarly, subelement 531(1) is connected via a connecting trace 531b to subelement 531(2), which is in the same column as subelement 531(1), but is in a different unit cell in a different row of unit cells. In one embodiment, the large subelements within the same column region make up two sensor electrodes that have their respective subelements interleaved so that the subelements belonging to the electrodes alternate from one end of the column region to the opposite end.

In one embodiment, each of the small subelements 541-544 may be electrically connected via one or more connecting traces to another small subelement in a different unit cell. For example, small subelement 542(1) may be electrically connected via a connecting trace 542b to small subelement 542(2), which is in the same column and in a different unit cell and different row of unit cells.

In one embodiment, a small subelement that is capacitively coupled to a first large subelement may be electrically connected to another small subelement that capacitively coupled with a second large subelement different from the first large subelement. For example, small subelement 543(1) is closest to, and thus has its greatest capacitive coupling with, the large subelement 530(2). Accordingly, small subelement 543(1) is electrically coupled with small subelement 543(2), which is closest to large subelement 531(2).

Figure 6A:
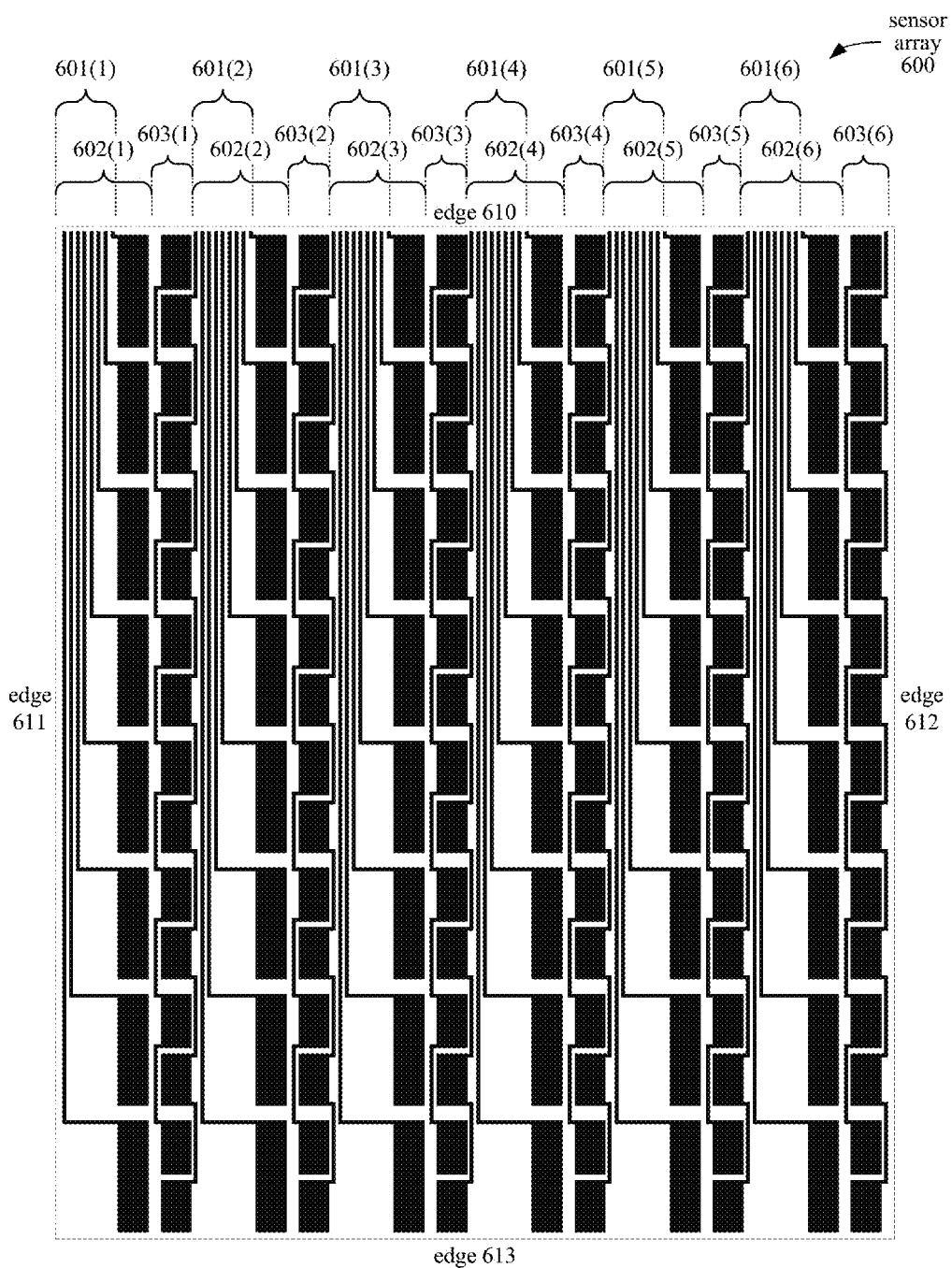
FIG. 6A illustrates an embodiment of a sensor array.

FIG. 6A illustrates a capacitive sensor array 600, according to an embodiment. In one embodiment, the sensor array 600 includes a pattern of conductive material including similar features as the pattern 500, as illustrated in FIG. 5A.

In one embodiment, the surface area of sensor array pattern 600 is bounded by top, left, right, and bottom edges 610, 611, 612, and 613. In one embodiment, the surface area of the sensor array pattern is the active sensing area of the sensor array. The surface area of sensor array pattern 600 may be divisible into alternating column regions. Specifically, a first set of column regions may include column regions 602(1), 602(2), 602(3), 602(4), 602(5), and 602(6), which are interleaved with a second set of column regions, including column regions 603(1), 603(2), 603(3), 603(4), 603(5), and 603(6). In other words, the column regions from the first set and second set of column regions alternate along the length of a horizontal axis passing from edge 611 to 612 through the longitudinal axes of the column regions 602 and 603. In one embodiment, the large subelements are located within first set of column regions 602, while the small subelements are located within the second set of column regions 603.

In one embodiment, each of the column regions 602 and 603 extends from a first edge 610 to a second edge 613 of the surface area of sensor array 600. In one embodiment, the surface area of sensor array 600 is substantially rectangular such that the first edge 610 is opposite the second edge 613.

In one embodiment, the area of the sensor array 600 may include routing channels 601(1), 601(2), 601(3), 601(4), 601(5), and 601(6), which contain the routing traces that are electrically connected to the subelements, and that extend from the subelements towards the edge 610 of the sensor array 600.

In one embodiment, a sensing region may exist wherever a small subelement is near a large subelement; thus, as illustrated in FIG. 6A, sensor array 600 may have a resolution of 16×6 sensing regions. In one embodiment, the surface area of sensor array 600 may be divisible into a grid of 8 rows and 6 columns, where each unit cell includes two sensing regions.

Figure 6B:
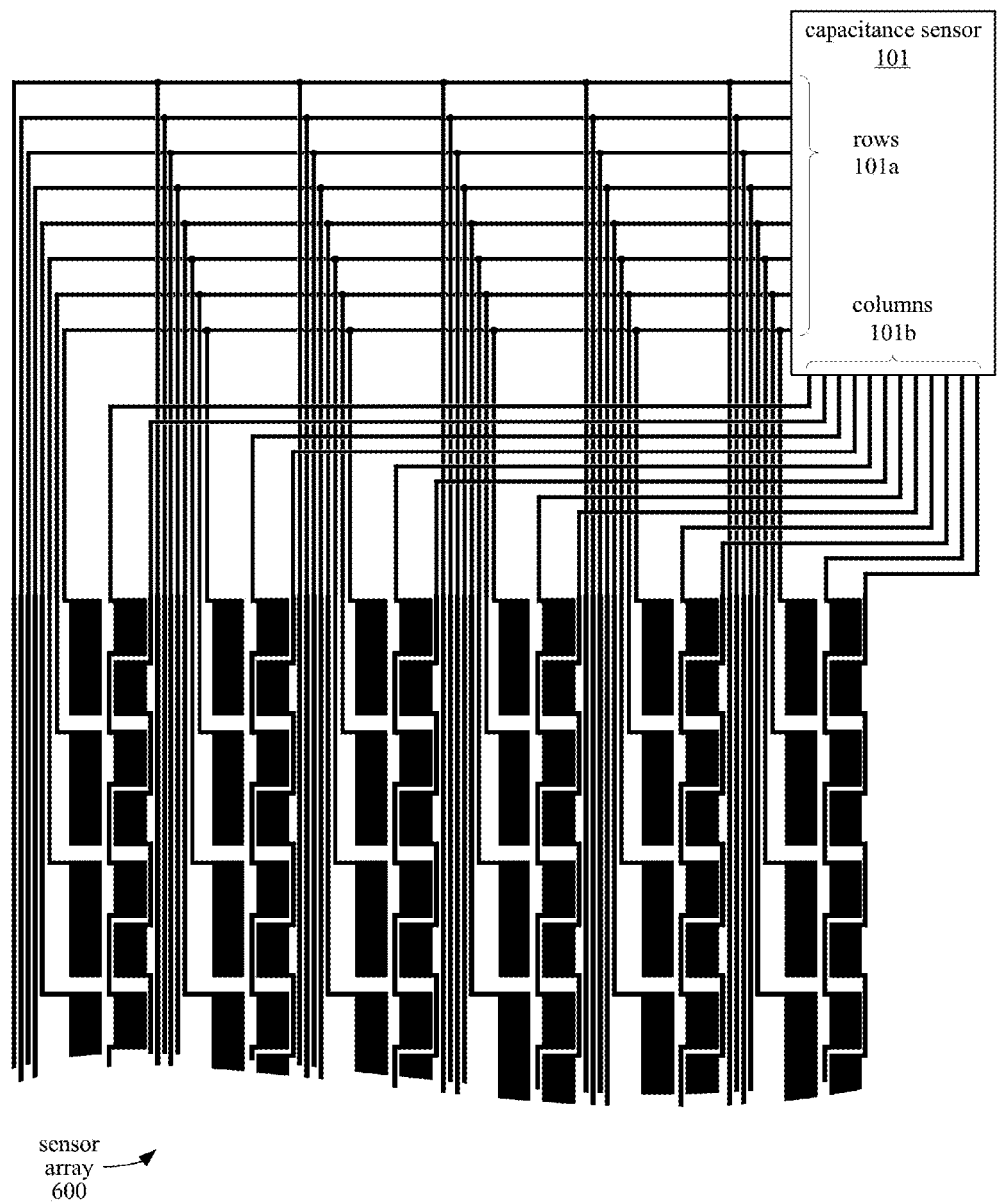
FIG. 6B illustrates electrical connections between a sensor array and a capacitance sensor, according to an embodiment.

FIG. 6B illustrates electrical connections between the sensor array 600 and a capacitance sensor 101, according to one embodiment. As illustrated in FIG. 6B, each of the sensor electrodes large subelements may be electrically connected to one of the row pins 101a of the capacitance sensor 101. In one embodiment, each of the large subelements in the same row of unit cells may be connected to the same row pin, while each of the large subelements in the same column of unit cells may be connected to a different row pin. As illustrated in FIG. 6B, each of the sensor electrodes including small subelements may be connected to one of the column pins 101b of capacitance sensor 101. In alternative embodiments, the large subelements may be electrically connected to column pins, while the small subelements are electrically connected to row pins.

Figure 7:
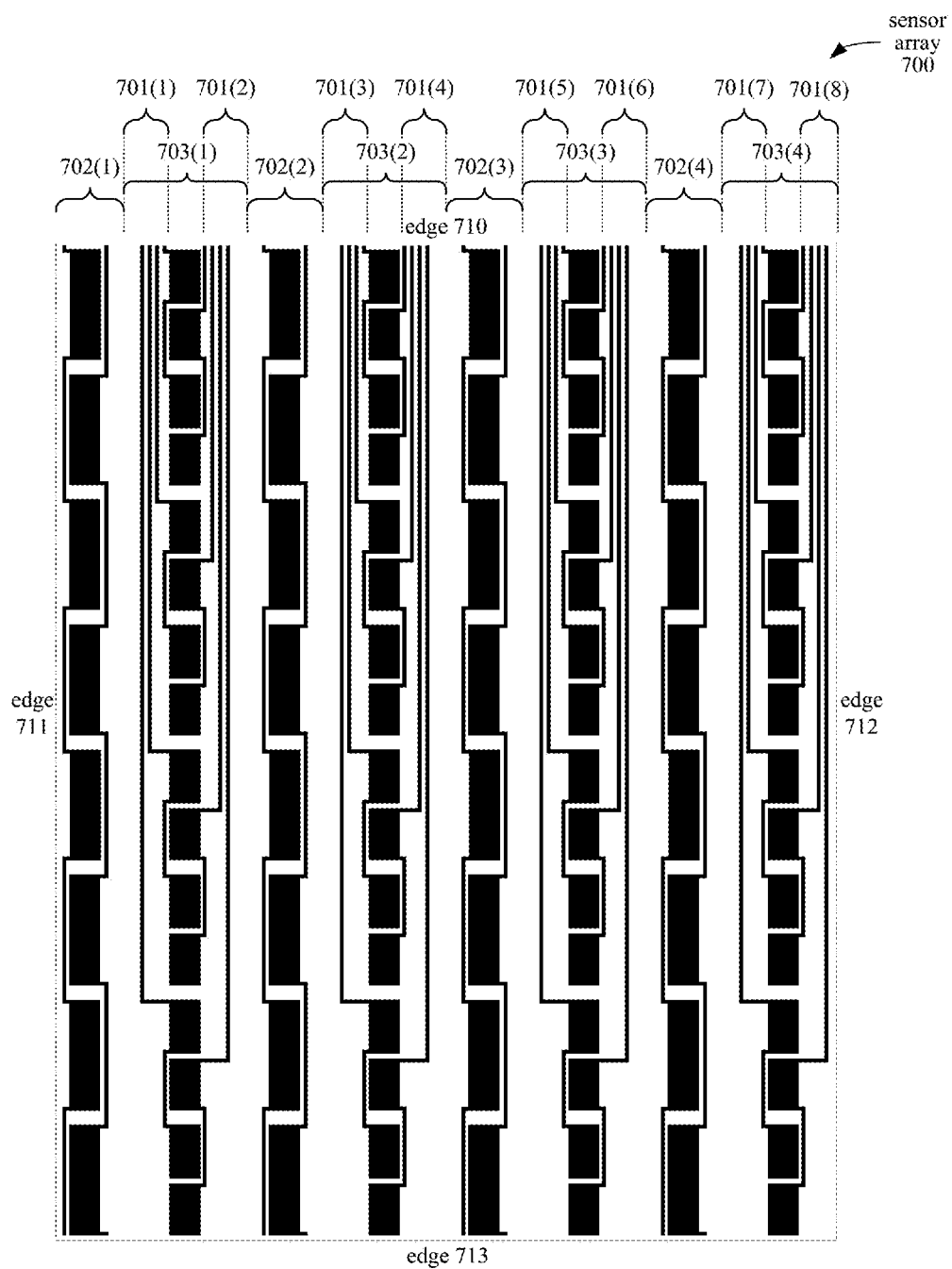
FIG. 7 illustrates an embodiment of a sensor array.

FIG. 7 illustrates an embodiment of a sensor array 700. In one embodiment, the sensor array 700 includes a pattern of conductive material similar to the pattern as illustrated in FIG. 5C.

In one embodiment, the surface area of sensor array pattern 700 is bounded by top, left, right, and bottom edges 710, 711, 712, and 713. In one embodiment, the surface area of the sensor array pattern 700 is the active sensing area of the pattern 700. The surface area of sensor array pattern 700 may be divisible into alternating column regions. Specifically, a first set of column regions may include column regions 702(1), 702(2), 702(3), and 702(4), which are interleaved with a second set of column regions, including column regions 703(1), 703(2), 703(3), and 703(4). In other words, the column regions from the first set and second set of column regions alternate along the length of a horizontal axis passing from edge 711 to 712 through the longitudinal axes of the column regions 702 and 703. In one embodiment, the large subelements are located within first set of column regions 702, while the small subelements are located within the second set of column regions 703.

In one embodiment, the routing channels 701(1)-701(8) are areas including the routing traces that are electrically connected to the small subelements are extend from the small subelements towards an edge 710 where they can be connected to a capacitance sensor.

Figures 8A, 8B:
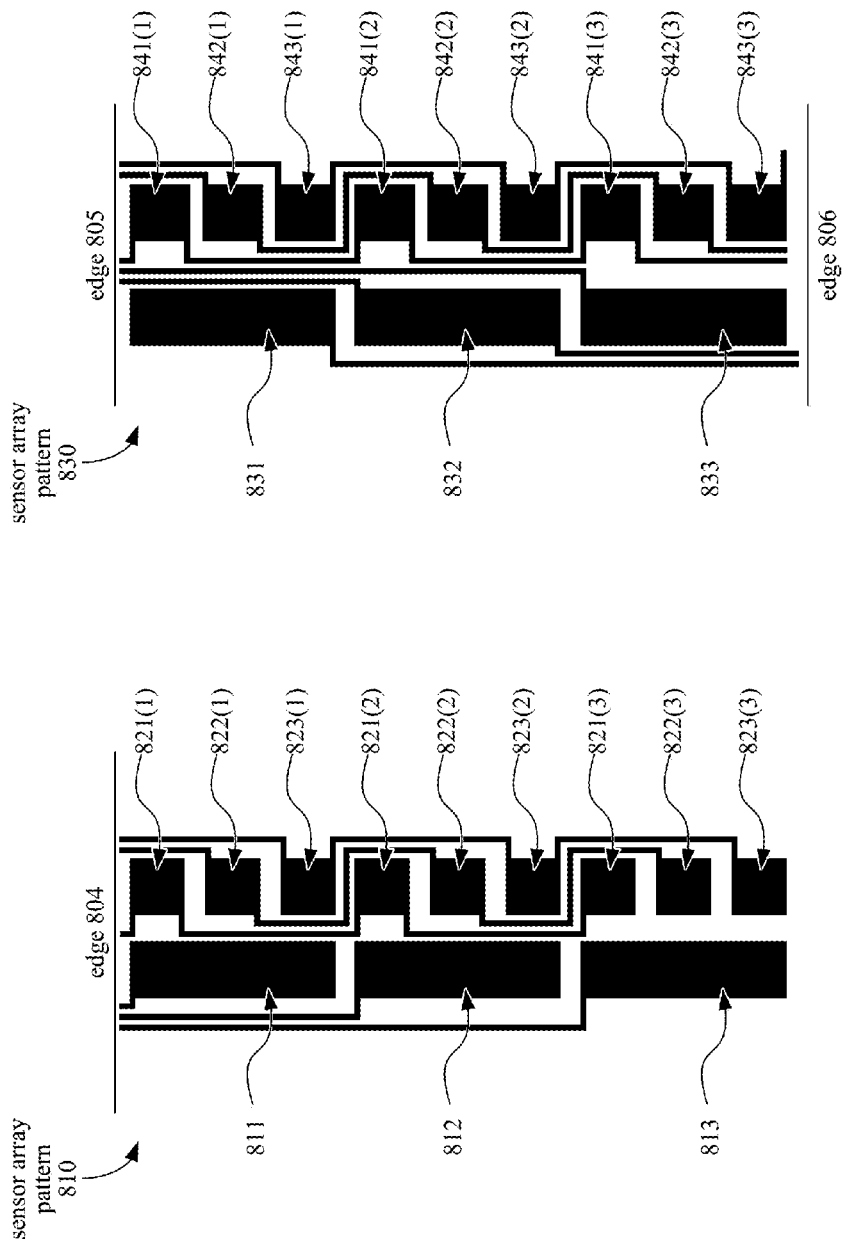
FIGS. 8A and 8B illustrate embodiments of sensor array patterns.

FIG. 8A illustrates an embodiment of a pattern 810 for a single layer capacitive sensor array having a value of k=3, such that three small subelements are matched with each large subelement. In pattern 810, for example, the large subelement 811 is adjacent to the small subelements 821(1), 822(1), and 823(1), such that three sensing regions are formed, between large subelement 811 and each of the small subelements 821(1), 822(1), and 823(1). Accordingly, each unit cell contains one large subelement and three small subelements; thus, each unit cell contains three sensing regions.

In one embodiment, the order of the small subelements is the same within each unit cell. For example, within each unit cell, electrode 821 is at the top, electrode 822 is in the middle, and electrode 823 is at the bottom of the unit cell. In one embodiment, the small subelements are aligned vertically along an axis that is parallel to a longitudinal axis of the large subelements.

FIG. 8A also illustrates the routing of connecting traces that electrically connect the small subelements. In one embodiment, connecting traces and routing traces may connect to different sides of the small subelements. For example, subelements of electrode 821 are connected to traces on the left side, subelements of electrode 822 are connected to traces on both left and right sides, and subelements of electrode 823 are connected to traces on the right side. In one embodiment, each sensor electrode, whether consisting of large subelements or small subelements, is electrically coupled with a routing trace that extends to an edge 804 of the capacitive sensor array.

FIG. 8B illustrates an embodiment of a pattern 830 for a single layer capacitive sensor array. Similar to the pattern 810 illustrated in FIG. 8A, the pattern 830 also has a value of k=3, such that three small subelements are matched with each large subelement.

In one embodiment, each subelement is electrically connected to a routing trace that extends to an edge 805 of the capacitive sensor array and is also connected to a routing trace that extends to a bottom edge 806 of the capacitive sensor array. In one embodiment, the edge 806 is opposite the edge 805. Thus, according to one embodiment, each electrode may be routed via the routing traces to two opposite sides of the capacitive sensor array.

FIGS. 9A, 9B, 9C, and 9D illustrate embodiments of a single layer capacitive sensor array pattern that include electrodes comprising large subelements and electrodes comprising small subelements. In one embodiment, electrodes corresponding to different rows or columns may have different shapes and/or dimensions. In one embodiment, this variation in subelement geometry may be used to compensate for signal non-uniformity across the sensor array. FIGS. 9A, 9B, 9C, and 9D thus illustrate embodiments of pattern layouts having varied and fixed heights of sensor electrodes subelements.

Figures 9A, 9B:
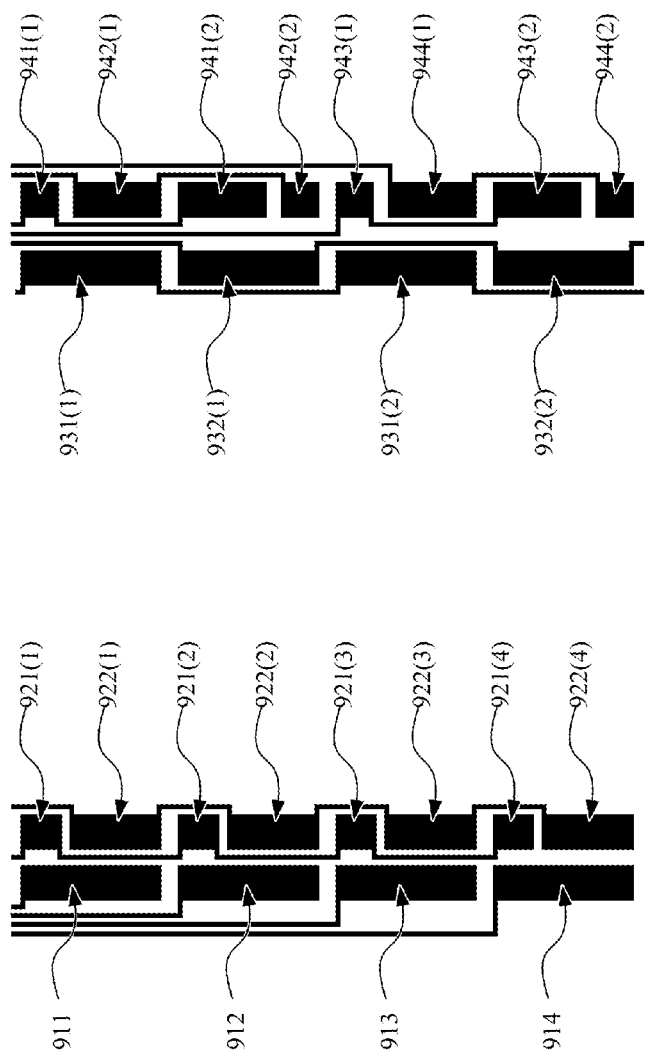
FIGS. 9A, 9B, 9C, and 9D illustrate embodiments of sensor array patterns.

FIG. 9A illustrates an embodiment of a sensor array pattern where subelements of the same electrode may be substantially the same size, but subelements of different electrodes may be different sizes. For example, the subelements 921(1), 921(2), 921(3), and 921(4), which are electrically coupled together as part of the same electrode, are similar in size to each other; however, these subelements may each be smaller in size than any of subelements 922(1), 922(2), 922(3), or 922(4).

In one embodiment, notwithstanding the different sizes of the subelements, the combined area of the small subelements paired with a large subelement in the same unit cell may be less than the area of the large subelement. For example, the combined area of small subelements 921(1) and 922(1) may be less than or equal to the area of the large subelement 910. In one embodiment, the large subelements 911, 912, 913, and 914 may be similar in size, and may each be larger than any of the subelements of electrodes 921 or 922.

FIG. 9B illustrates an embodiment of a sensor array pattern where subelements of the same electrode may be different sizes. In one embodiment, each electrode may have two small electrodes, one of which is smaller than the other. For example, the electrode 941 may have two small subelements 941(1) and 941(2), where subelement 941(1) is smaller than subelement 941(2). Similarly, electrode 942 has two small subelements 942(1) and 942(2), where subelement 942(2) is smaller than subelement 942(1); electrode 943 has two small subelements 943(1) and 943(2), where subelement 943(1) is smaller than subelement 942(2); and electrode 944 has two small subelements 944(1) and 944(2), where subelement 944(2) is smaller than subelement 944(1). In one embodiment, the subelements of sensor electrode 941 may be interleaved with the subelements of sensor electrode 942, while the subelements of sensor electrode 943 may be interleaved with the subelements of sensor electrode 944.

Figures 9C, 9D:
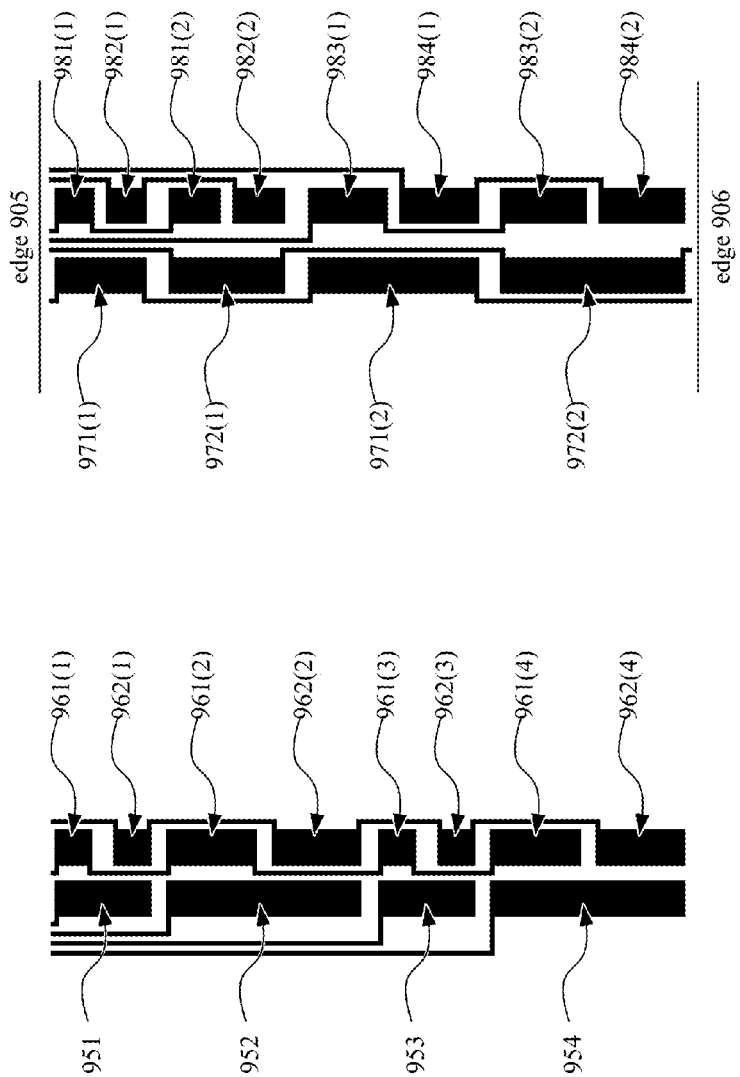

FIG. 9C illustrates an embodiment of a sensor array pattern where the heights of both the large subelements and the small subelements are varied. In one embodiment, each of the large subelements 951, 952, 953, and 954 may be electrically isolated from each other and may have alternating sizes. In particular, subelements 951 and 953 are similar in size, and subelements 952 and 954 are similar in size and are each larger than either of subelements 951 and 953.

As illustrated in FIG. 9C, each of the large subelements is larger than either of the small subelements with which the large subelement is paired; however, in one embodiment, a "large" subelement may be smaller than a "small" subelement in a different row. For example, subelement 951 has a larger area than either of the small subelements 961(1) and 962(1), but may be smaller than subelement 961(2).

As illustrated in FIG. 9C, the sensor electrode 961 includes small subelements 961(1), 961(2), 961(3), and 961(4). Of these subelements, subelements 961(1) and 961(3) are similar in size, and subelements 961(2) and 961(4) are similar in size and are each larger than either of subelements 961(1) and 961(3). Sensor electrode 962 includes small subelements 962(1), 962(2), 962(3), and 962(4). Of these subelements, subelements 962(1) and 962(3) are similar in size, and subelements 962(2) and 962(4) are similar in size and are each larger than either of subelements 962(1) and 962(3). In one embodiment, the subelements of sensor electrode 961 may be interleaved with the subelements of sensor electrode 962.

FIG. 9D illustrates an embodiment of a single layer sensor pattern having large and small sensor electrode subelements where the subelements vary in size progressively from one side of the sensor array area to another. For example, the large subelements 971(1), 972(1), 971(2), and 972(2) may become progressively larger the farther they are from edge 905 and the nearer they are to an opposite edge 906. Similarly, each of the small subelements 981(1), 982(1), 981(2), 982(2), 983(1), 984(1), 983(2), and 984(2) may become progressively larger they farther they are from edge 905 and the nearer they are to edge 906.

In one embodiment, the subelements 981(1) and 981(2) of sensor electrode 981 may be interleaved with the subelements 982(1) and 982(2) of sensor electrode 982. The subelements 983(1) and 983(2) of sensor electrode 983 may be interleaved with the subelements 984(1) and 984(2) of sensor electrode 984.

Figure 10A:
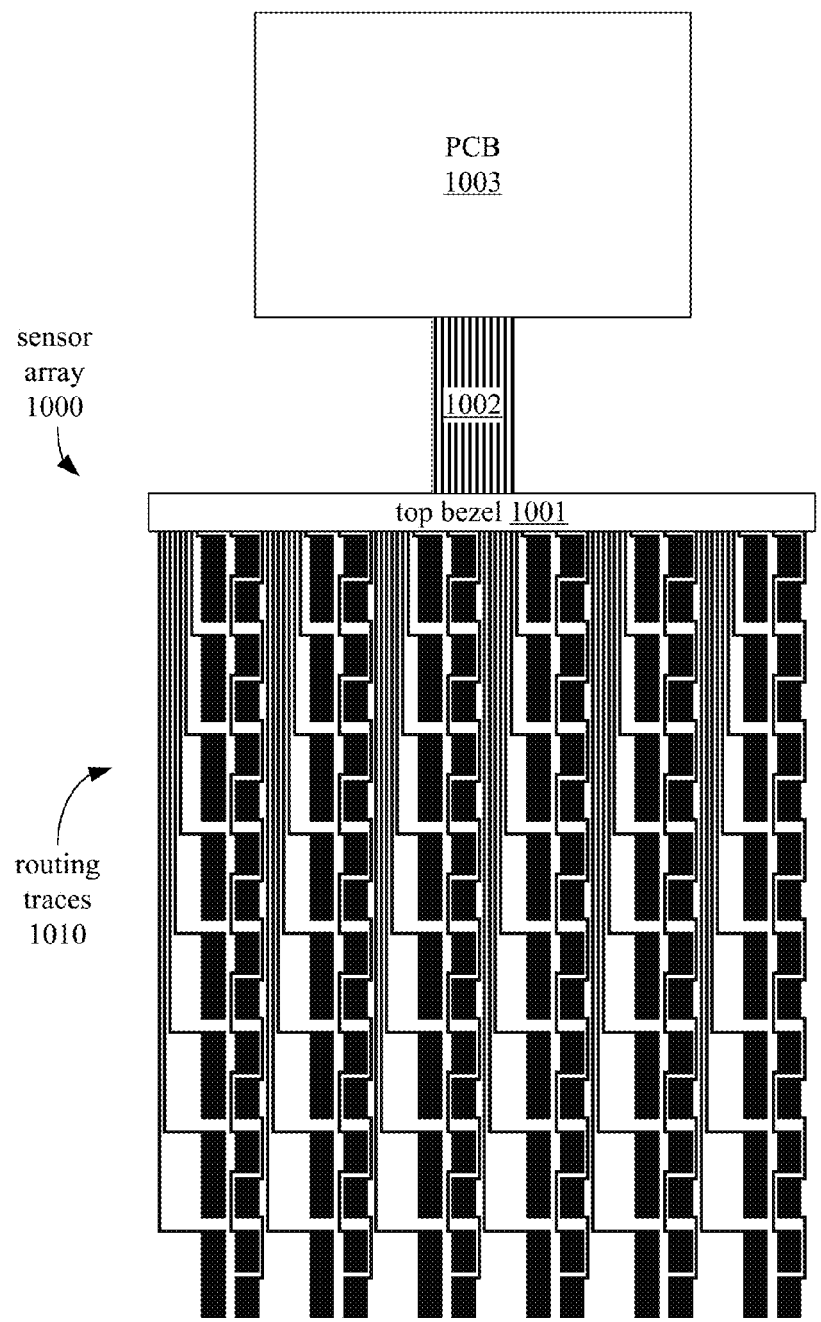
FIGS. 10A and 10B illustrate embodiments of sensor arrays with one or more bezels.

FIG. 10A illustrates an embodiment of a sensor array 1000 having a pattern similar to the pattern as illustrated in FIG. 5B. In one embodiment, sensor array 1000 includes a number of routing traces, such as routing traces 1010, that are electrically connected to the sensor electrodes in sensor array 1000 and extend towards an edge of the sensor array 1000. In one embodiment, the routing traces 1010 may connect the sensor electrodes to pins outside of the active sensing area. In one embodiment, the pins may be hidden by an opaque top bezel.

In one embodiment, the sensor electrodes in the array 1000 may be connected to circuitry on a PCB 1003 via a connector 1002. In one embodiment, the connector 1002 may be made from conductive material on a flexible substrate. In one embodiment, components of the capacitance sensing system, such as the processing device 110 may be mounted on the PCB 1003. In one embodiment, other hardware, such as hardware supporting a display over which the sensor array is overlaid, may also be mounted on PCB 1003.

In one embodiment, one or more of the sensor electrodes in array 1000 may be connected together; for example, each of the sensor electrodes including large subelements that are in the same row of unit cells may be electrically coupled together and sensed together. In one embodiment, some or all of the connections between sensor electrodes may be established by one or more switches, multiplexers, conductive traces, or other conductive paths that may reside on or underneath the bezel 1001, on the PCB 1003, or on some other part of the sensor array assembly.

Figure 10B:
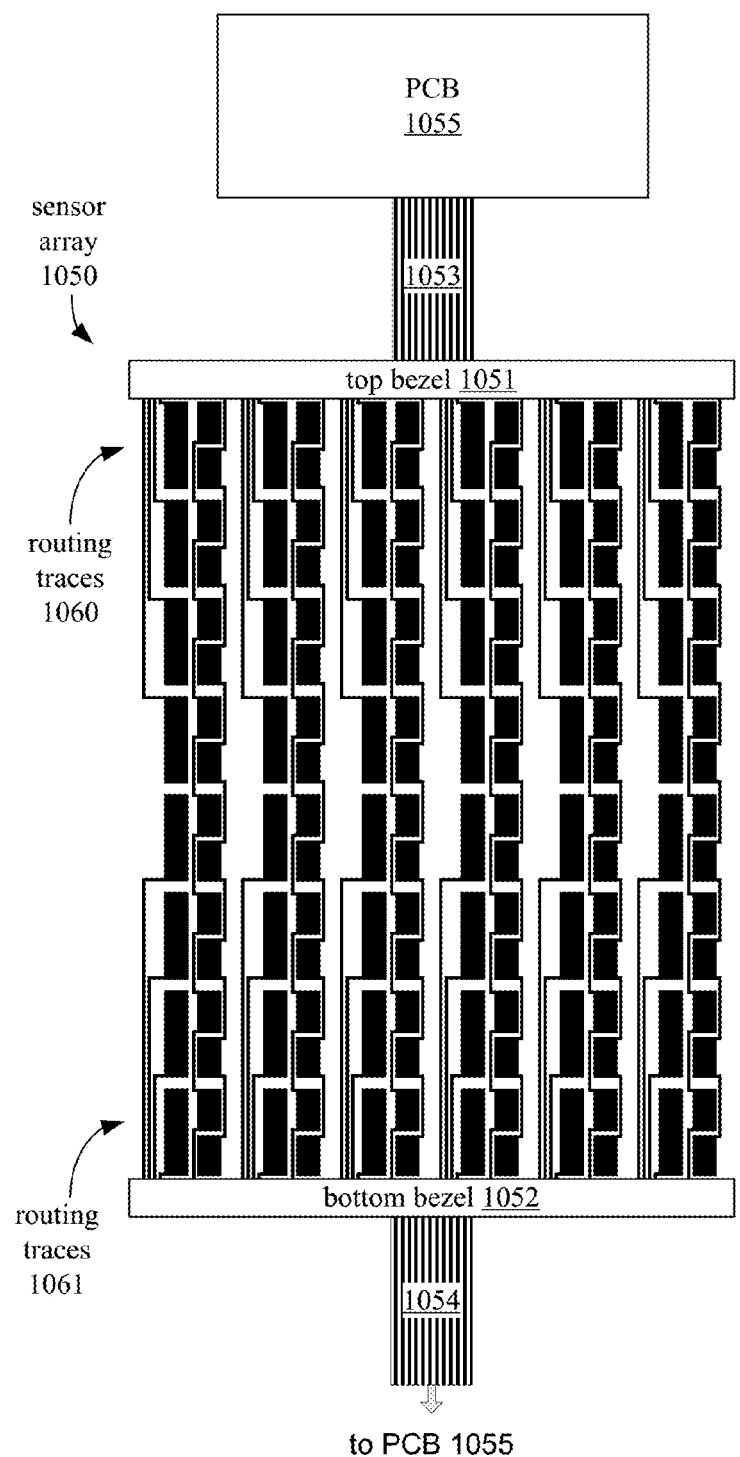

FIG. 10B illustrates an embodiment of a sensor array 1050 having a sensor pattern that is similar to the pattern of sensor array 1000, but for the routing traces, such as routing traces 1060 and 1061, that lead in opposite directions to a top bezel 1051 and a bottom bezel 1052, respectively. In one embodiment, routing traces that are electrically connected to a particular subelement extend towards the one of two opposite edges of the sensor array that is nearer to the particular subelement in order to minimize the length of the routing trace. For example, the large subelements nearest the top bezel 1051 are connected to routing traces that extend towards the top bezel 1051, while the large subelements nearest the bottom bezel are connected to routing traces that extend toward the bottom bezel 1052.

In one embodiment, the sensor electrodes in the array 1050 may be connected to circuitry on a PCB 1055 via connectors 1053 and 1054. In one embodiment, one or both of the connectors 1053 and 1054 may be made from conductive material on a flexible substrate. In one embodiment, components of the capacitance sensing system, such as the processing device 110 may be mounted on the PCB 1055. In one embodiment, other hardware, such as hardware supporting a display over which the sensor array is overlaid, may also be mounted on PCB 1055.

In one embodiment, one or more of the sensor electrodes in array 1050 may be connected together; for example, each of the sensor electrodes including large subelements that are in the same row of unit cells may be electrically coupled together and sensed together. In one embodiment, some or all of the connections between sensor electrodes may be established by one or more switches, multiplexers, conductive traces, or other conductive paths that may reside on or underneath one or both of the bezels 1051 and 1052, on the PCB 1055, or on some other part of the sensor array assembly.

In the foregoing embodiments, various modifications can be made; for example, row sensor electrodes and column sensor electrodes may be interchanged, and row or column sensor electrodes may be used as either TX or RX sensor electrodes. Similarly, sensor electrodes comprising large subelements may be used as TX or RX sensor electrodes and sensor electrodes comprising small subelements may be used as RX or TX sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
a first set of sensor electrodes each comprising one or more large subelements; and
a second set of sensor electrodes each comprising one or more small subelements, wherein each of the small subelements is smaller than any of the large subelements, wherein at least one of the first set of sensor electrodes and the second set of sensor electrodes includes at least three sensor electrodes, wherein the first set of sensor electrodes and the second set of sensor electrodes are formed from a single layer of conductive material, wherein a surface area of the capacitive sensor array is divisible into a grid of N×M unit cells, wherein each of the N×M unit cells contains one of the large subelements and k of the small subelements, wherein for each set of the first set of sensor electrodes and the second set of sensor electrodes, a longitudinal axis crosses at least a portion of each of the subelements of sensor electrodes in the set that are in the same column of unit cells, wherein any subelements of the large and small subelements contained within a first unit cell of the N×M unit cells that is nearer to an end of the column than a second unit cell of the N×M unit cells have a smaller combined area than subelements contained within the second unit cell, wherein the first unit cell is shorter than the second unit cell along the longitudinal axis, wherein the large subelement in the first unit cell is electrically isolated from the large subelement in the second unit cell, and wherein N is greater than or equal to 2, M is greater than or equal to 2, and k is greater than or equal to 2.

2. The capacitive sensor array of claim 1, wherein the total number of small subelements is k times the total number of large subelements.

3. The capacitive sensor array of claim 1, wherein at least one of the unit cells includes a first region of greatest capacitive coupling between a large subelement and a first small subelement and a second region of greatest capacitive coupling between the large subelement and a second small subelement.

4. The capacitive sensor array of claim 3, wherein the first small subelement and the second small subelement are arranged along an axis parallel to a longitudinal axis of the large subelement.

5. The capacitive sensor array of claim 1, wherein each of the large subelements is electrically isolated from each of the large subelements in a different row of the grid of N×M unit cells, and wherein each of the small subelements is electrically coupled via one or more connecting traces with another of the small subelements in a same column of the grid of N×M unit cells, wherein each of the small subelements is wider than any of the one or more connecting traces.

6. The capacitive sensor array of claim 1, wherein each of the large subelements is electrically coupled with at least another large subelement in the same column of the grid of N×M unit cells, and wherein each of the small subelements is electrically coupled with at least one other small subelement in a different unit cell.

7. The capacitive sensor array of claim 1, wherein a combined area of the small subelements is less than a combined area of the large subelements.

8. The capacitive sensor array of claim 1, wherein two or more of the large subelements are substantially equal in size, and wherein two or more of the small subelements are substantially equal in size.

9. The capacitive sensor array of claim 1, wherein each of the first set of sensor electrodes comprises a routing trace extending from the one or more large subelements to a first edge of the surface area, and wherein each of the second set of sensor electrodes comprises a routing trace extending from the one or more small subelements to the first edge of the surface area.

10. A capacitive sensor array, comprising:
a first set of sensor electrodes each comprising one or more large subelements; and
a second set of sensor electrodes each comprising one or more small subelements, wherein at least one of the first set of sensor electrodes and the second set of sensor electrodes includes at least three sensor electrodes, wherein the first set of sensor electrodes and the second set of sensor electrodes are formed from a single layer of conductive material, wherein a surface area of the capacitive sensor array is divisible into a first set of column regions and a second set of column regions interleaved with the first set of column regions, wherein each of the first set of column regions and second set of column regions extends from a first edge of the surface area to a second edge of the surface area, and wherein for each column region in the first set of column regions, the column region includes N large subelements each intersected by a longitudinal axis of the column region, wherein for each column region in the second set of column regions, the column region includes N×k small subelements each intersected by a longitudinal axis of the column region, wherein N is greater than or equal to 2, wherein k is greater than or equal to 2, wherein any subelements of the large and small subelements contained within a first unit cell, which includes one of the large subelements and k of the small subelements and is nearer to an end of the column region than a second unit cell in the same column region, have a smaller combined area than subelements contained within the second unit cell, wherein the first unit cell is shorter than the second unit cell along the longitudinal axis, and wherein the large subelement in the first unit cell is electrically isolated from the large subelement in the second unit cell.

11. The capacitive sensor array of claim 10, wherein the total number of small subelements is k times the number of large subelements, and wherein a combined area of the small subelements is less than a combined area of the large subelements.

12. The capacitive sensor array of claim 10, wherein two or more of the large subelements are substantially equal in size, and wherein two or more of the small subelements are substantially equal in size.

13. The capacitive sensor array of claim 10, wherein the surface area is substantially rectangular, and wherein the second edge of the surface area is opposite the first edge of the surface area.

14. The capacitive sensor array of claim 10, wherein the surface area is divisible into a grid of N×M unit cells each overlapping one of the first set of column regions and one of the second set of column regions, and wherein each unit cell includes a region of greatest capacitive coupling between one of the large subelements and each of k small subelements.

15. The capacitive sensor array of claim 10, wherein each of the large subelements in the same column region are electrically isolated from each other, and wherein each of the small subelements in a column region is electrically connected to at least another of the small subelements in the same column region.

16. The capacitive sensor array of claim 10, wherein each of the large subelements is electrically coupled with at least another large subelement in the same column region, and wherein each of the small subelements is electrically coupled with at least another small subelement in the same column region.

17. The capacitive sensor array of claim 10, wherein each of the first set of sensor electrodes comprises a routing trace extending from the one or more large subelements to the first edge of the surface area, and wherein each of the second set of sensor electrodes comprises a routing trace extending from the one or more small subelements to the first edge of the surface area.

18. A capacitance sensing system, comprising:
a capacitance sensor;
a first set of sensor electrodes of a capacitive sensor array coupled with the capacitance sensor, wherein each of the first set of sensor electrodes comprises one or more large subelements; and
a second set of sensor electrodes of the capacitive sensor array, wherein each of the second set of sensor electrodes comprises one or more small subelements, wherein each of the small subelements is smaller than any of the large subelements, wherein at least one of the first set of sensor electrodes and the second set of sensor electrodes includes at least three sensor electrodes, wherein the first set of sensor electrodes and the second set of sensor electrodes are constructed from a single layer of conductive material, wherein a surface area of the capacitive sensor array is divisible into a grid of N×M unit cells, wherein each of the N×M unit cells contains one large subelement and k small subelements, wherein any subelements of the large and small subelements contained within a first unit cell of the N×M unit cells that is nearer to an end of the column than a second unit cell of the N×M unit cells have a smaller combined area than subelements contained within the second unit cell, wherein for each set of the first set of sensor electrodes and the second set of sensor electrodes, a longitudinal axis crosses at least a portion of each of the subelements of sensor electrodes in the set that are in the same column of unit cells, wherein the first unit cell is shorter than the second unit cell along the longitudinal axis, wherein the large subelement in the first unit cell is electrically isolated from the large subelement in the second unit cell, and wherein N is greater than or equal to 2, M is greater than or equal to 2, and k is greater than or equal to 2.

19. The capacitance sensing system of claim 18, wherein at least one of the unit cells includes a first region of greatest capacitive coupling between a large subelement and a first small subelement and a second region of greatest capacitive coupling between the large subelement and a second small subelement, and wherein the capacitance sensor is configured to measure a first mutual capacitance between the large subelement and the first small subelement and a second mutual capacitance between the large subelement and the second small subelement.

20. The capacitance sensing system of claim 18, wherein the capacitance sensor is configured to generate a matrix of capacitance values by performing a matrix transformation operation based on a matrix of mutual capacitance values measured from the capacitive sensor array.

\* \* \* \* \*